(12) United States Patent
Graf et al.

(10) Patent No.: US 11,325,690 B1
(45) Date of Patent: May 10, 2022

(54) INTEGRATED AIRCRAFT ANTENNA AND LIGHT ASSEMBLIES

(71) Applicant: Rockwell Collins, Inc., Cedar Rapids, IA (US)

(72) Inventors: Joseph T. Graf, Center Point, IA (US); James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/074,113

(22) Filed: Oct. 19, 2020

(51) Int. Cl.
| | |
|---|---|
| *B64C 1/36* | (2006.01) |
| *B64D 47/02* | (2006.01) |
| *H01Q 1/28* | (2006.01) |
| *H01Q 1/44* | (2006.01) |
| *F21V 15/01* | (2006.01) |
| *H01Q 21/06* | (2006.01) |
| *F21V 23/00* | (2015.01) |
| *F21Y 115/10* | (2016.01) |
| *F21W 107/30* | (2018.01) |

(52) U.S. Cl.
CPC ............... *B64C 1/36* (2013.01); *B64D 47/02* (2013.01); *F21V 15/01* (2013.01); *H01Q 1/282* (2013.01); *H01Q 1/44* (2013.01); *H01Q 21/061* (2013.01); *B64D 2203/00* (2013.01); *F21V 23/003* (2013.01); *F21W 2107/30* (2018.01); *F21Y 2115/10* (2016.08)

(58) Field of Classification Search
CPC ............... B64C 1/36; B64D 47/02–06; B64D 2203/00; F21V 15/00–015; F21V 23/00–006; F21W 2107/30; F21Y 2115/10; H01Q 1/282; H01Q 1/44–46; H01Q 21/06–068
See application file for complete search history.

(56) References Cited

U.S. PATENT DOCUMENTS

| | | |
|---|---|---|
| 5,488,456 A | 1/1996 | Jamzadeh |
| 6,646,613 B1 | 11/2003 | Cheng |
| 7,300,185 B1* | 11/2007 | Ruffin ....................... F21K 9/68 362/347 |
| 7,741,782 B2 | 6/2010 | Vermeulen et al. |
| 8,227,732 B2 | 7/2012 | Kito et al. |
| 9,184,497 B2 | 11/2015 | Chen et al. |
| 9,345,105 B2 | 5/2016 | De Jong et al. |
| 9,445,483 B2 | 9/2016 | Louh et al. |
| 9,635,742 B2 | 4/2017 | Sun et al. |
| 9,871,290 B1 | 1/2018 | DeMersseman |

(Continued)

FOREIGN PATENT DOCUMENTS

| | | |
|---|---|---|
| CN | 108963411 A | 12/2018 |
| CN | 208820056 U | 5/2019 |

(Continued)

*Primary Examiner* — Jason M Han
(74) *Attorney, Agent, or Firm* — Suiter Swantz pc llo

(57) ABSTRACT

Disclosed are embodiments of exterior aircraft assemblies integrating compatible elements. In one example, an integrated aircraft assembly includes an aerodynamic housing attachable to an aircraft, an antenna system including at least one antenna element housed within the aerodynamic housing, and a lighting system including at least one light fixture housed within the aerodynamic housing. The at least one antenna element and the at least one light fixture may be co-located within then housing or mounted separately on the housing.

13 Claims, 5 Drawing Sheets

(56) References Cited

U.S. PATENT DOCUMENTS

| | | | |
|---|---|---|---|
| 10,009,984 B2 | 1/2018 | Creemers et al. |
| 9,960,475 B2 | 5/2018 | Chen et al. |
| 9,967,958 B2 | 5/2018 | Creemers et al. |
| 10,080,274 B2 | 9/2018 | Johnson |
| 10,355,340 B2 | 7/2019 | Marinus et al. |
| 10,487,990 B2 | 11/2019 | Gielen et al. |
| 10,655,833 B2 | 5/2020 | Freer et al. |
| 2006/0152941 A1 | 7/2006 | Chiang |
| 2014/0168020 A1 | 6/2014 | Stoytchev et al. |
| 2015/0280316 A1 | 10/2015 | Tso |
| 2017/0270786 A1 | 9/2017 | Swaminathan et al. |
| 2017/0317400 A1 | 11/2017 | Robinson |
| 2019/0215935 A1 | 7/2019 | Trublowski et al. |
| 2019/0393613 A1 | 12/2019 | Kakuya et al. |
| 2020/0015340 A1 | 1/2020 | Louh et al. |
| 2020/0214114 A1 | 7/2020 | Wu et al. |

FOREIGN PATENT DOCUMENTS

| | | | | |
|---|---|---|---|---|
| DE | 10354632 A1 | 6/2005 | | |
| DE | 102004057515 A1 | 6/2006 | | |
| DE | 102005008378 A1 | 8/2006 | | |
| DE | 202006009591 U1 | 10/2006 | | |
| EP | 0559546 A1 | 9/1993 | | |
| EP | 1297353 A1 | 4/2003 | | |
| EP | 2993130 A1 * | 3/2016 | ............ | B64D 47/02 |
| FR | 2875473 A1 | 3/2006 | | |
| GB | 672611 A | 5/1952 | | |
| KR | 100891731 B1 | 4/2009 | | |
| KR | 101269033 B1 | 6/2013 | | |
| WO | 2014169502 A1 | 10/2014 | | |
| WO | 2018065404 A1 | 4/2018 | | |

\* cited by examiner

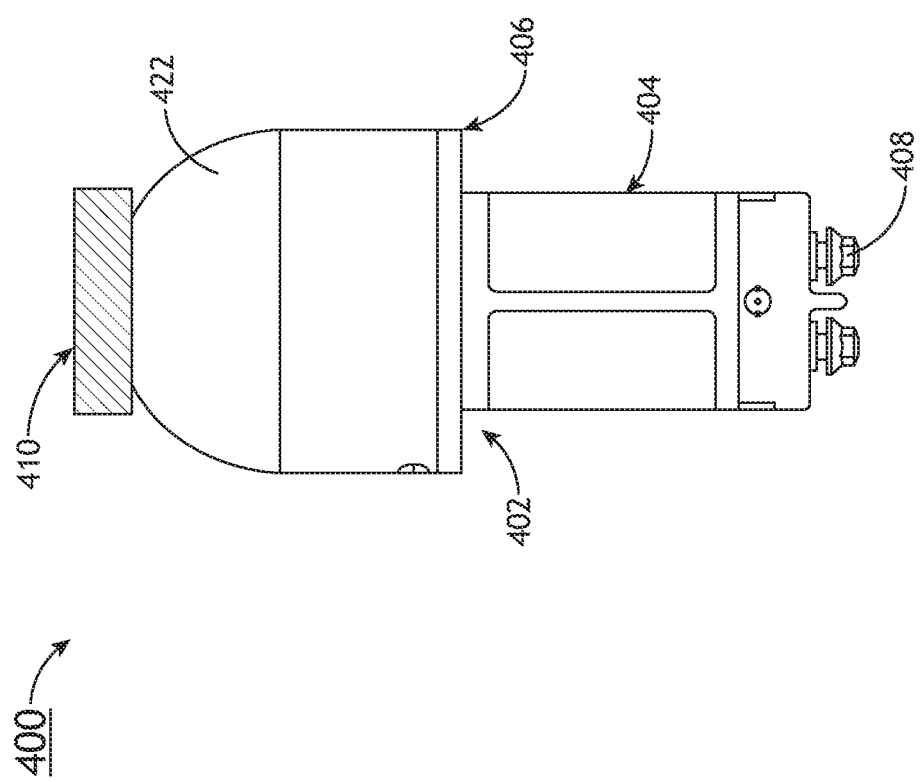

INTEGRATED AIRCRAFT ANTENNA AND LIGHT ASSEMBLIES

TECHNICAL FIELD

The subject matter disclosed herein relates generally to system co-location and more particularly to integrated aircraft assemblies including antenna and lighting structures.

BACKGROUND

There is a critical need to reduce drag and antenna count in high-performance aircraft such as attack helicopters and fighter jets. Many of these aircraft require dozens of apertures on the airframe for mounting communication, sensing and other flight-critical equipment, as well as for mounting lighting equipment for flight and safety. Each antenna assembly and associated structurally reinforced aperture adds weight and drag on the aircraft which impact mission performance and mission length.

Therefore, what is needed are solutions for consolidating separate aircraft systems to reduce the number of necessary structures.

SUMMARY

To achieve the foregoing and other advantages, in a first embodiment the present disclosure provides an integrated aircraft assembly including an aerodynamic housing attachable to an aircraft including a first portion for being received through a structurally reinforced aperture formed in an airframe of the aircraft and a second portion for being positioned external to the aircraft, an antenna system including at least one antenna element housed within the aerodynamic housing, and a lighting system including at least one light fixture housed within the aerodynamic housing, wherein the antenna system and the lighting system function independently.

In some embodiments, the integrated aircraft assembly may further include a base plate which may function as a substrate of the antenna assembly and a mounting surface for the at least one light fixture.

In some embodiments, the second portion of the aerodynamic housing may include bezel surrounding the base plate and a transparent lens coupled to the bezel, wherein the at least one antenna element and the at least one light fixture may be disposed beneath the transparent cover.

In some embodiments, the integrated aircraft assembly may further include at least one connector provided at a terminal end of the first portion for connecting with a power source internal to the aircraft.

In some embodiments, the at least one antenna element may be positioned internal or external to the second portion of the aerodynamic housing.

In some embodiments, the antenna system may be operable for providing at least one of a communication, navigation, sensing, and flight-critical function, and the lighting system may be operable for providing illumination for the exterior of the aircraft.

In some embodiments, the aerodynamic housing may be formed as an exterior aircraft light.

In some embodiments, the antenna system may include a substrate and an antenna array, and wherein the antenna array may include a central element provided on the substrate in a central position on the substrate and a plurality of parasitic elements provided on the substrate in a predetermined positional relationship relative to the central element, and wherein the lighting system may include a plurality of light fixtures interspersed between the plurality of parasitic elements.

In some embodiments, the aerodynamic housing may further include a base plate, the antenna system may include an end fire radiator element, for instance a plurality of individual Balanced Antipodal Vivaldi Antenna (BAVA) elements arranged in an annular array around the base plate, and the at least one light fixture may be a Light Emitting Diode (LED) mounted on a surface of the base plate.

In some embodiments, the at least one antenna element may be mounted atop the second portion of the aerodynamic housing.

In some embodiments, the integrated aircraft assembly may further include at least one control unit communicatively coupled to at least one of the antenna system and the lighting system and configured to interface with an aircraft power system.

According to another inventive aspect, the present disclosure provides an integrated aircraft assembly including a housing formed as an exterior aircraft lighting assembly, the housing including a first portion for being attached to an aircraft and a second portion for being positioned external to the aircraft, an antenna array coupled to the housing, and at least one light fixture coupled to the housing, wherein a function of the antenna array is independent of a function of the at least one light fixture.

In some embodiments, the antenna array and the at least one light fixture may be co-located in the housing.

In some embodiments, the second portion of the housing may include a base plate and a lens coupled to the base plate, the at least one light fixture may be positioned in the second portion under cover of the lens, and the antenna array may be mounted to the base plate.

This brief summary is provided solely as an introduction to subject matter that is fully described in the detailed description and illustrated in the drawings. This brief summary should not be considered to describe essential features nor be used to determine the scope of the claims. Moreover, it is to be understood that both the foregoing summary and the following detailed description are exemplary and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 4B is an end view of the integrated aircraft assembly of FIG. 4A.

DETAILED DESCRIPTION

Figure 1:
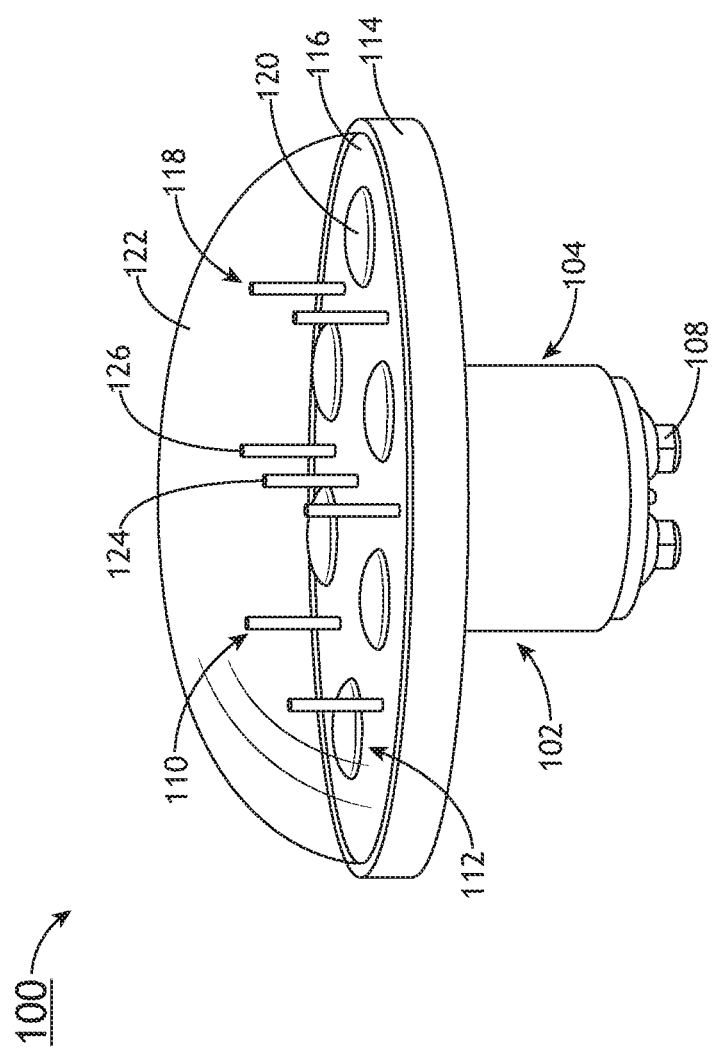
FIG. 1 illustrates an integrated aircraft assembly including interspersed antenna and lighting elements in accordance with an exemplary embodiment of the present disclosure.

Before explaining one or more embodiments of the disclosure in detail, it is to be understood that the embodiments are not limited in their application to the details of construction and the arrangement of the components set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, the present disclosure provides embodiments of integrated assemblies including aircraft lighting and communication/sensing equipment.

Referring to FIG. 1, an integrated aircraft assembly 100 in accordance with a first exemplary embodiment of the present disclosure is shown. The integrated assembly 100 includes an aerodynamic housing 102 configured for mounting to an aircraft. The housing 102 generally includes a first portion 104 for being received through a structurally reinforced aperture formed in an airframe and a second portion 106 for being positioned external to the aircraft, for instance mounted against or proximate the aircraft skin or streamlined into the surface of the aircraft. The first and second portions 104, 106 may be coupled together or may be integrally formed. One or more connectors 108 may be provided at a terminal end of the first portion 104 for connecting with one or more of a power source, light control, radio frequency (RF) control, RF cabling, etc., internal to the aircraft.

In some embodiments, the second portion 106 may be positioned 'atop' the first portion 104, and as shown, may envelope separate systems that may function independently (e.g., mutually exclusive) or may be operationally coupled. In some embodiments, the systems may include an antenna system 110 and a lighting system 112. For example, the antenna system 110 may provide one or more of communication, navigational, sensing, and flight-critical functions, while the lighting system 112 may provide illumination for the exterior of the aircraft. In some embodiments, the housing 102 may be implemented in the form of an exterior aircraft light and the antenna system 110 may be positioned internal or external to the housing 102. In other embodiments, the housing may be implemented in the form of an aircraft antenna assembly and the lighting system 112 may be positioned internal or external to the housing 102.

In some embodiments, the housing 102 may be formed as an exterior aircraft light and the lighting system 112 may be configured to provide illumination for such operations as navigation, landing, taxiing, positional indication, collision avoidance, inspection lighting, etc. Lights may be white or colored. For example, in an embodiment in which multiple integrated assemblies 100 are provided as a set of navigation lights, a first integrated assembly may be configured to produce white light, a second integrated assembly may be configured to produce green light, and a third integrated assembly may be configured to produce red light. In some embodiments, the lights may be configured for one or more of steady operation, intermittent flashing, and dimming. In some embodiments, the lighting system 112 may be implemented as an anticollision light including at least one rotating beam light and motor for rotating the same, and the integrated assembly may be installed on the vertical stabilizer. In some embodiments, the lighting system 112 may be implemented as a landing and/or taxi light, the integrated assembly may include a parabolic reflector for directing the beam of light, and the integrated assembly may be installed on the nose or leading edge of the wing.

As shown in FIG. 1, the second portion 106 envelopes the antenna system 110 and the lighting system 112. The second portion 106 may include a bezel 114 surrounding a base plate 116, wherein the base plate 116 functions as the substrate for an antenna array 118 and the mounting surface for the one or more individual light fixtures 120 of the lighting system 112. In some embodiments, the second portion 106 further includes a transparent, hemispherical lens 122 coupled to the base plate 116 for covering and protecting the light and antenna elements, and in some embodiments, focusing the beam of light.

Embodiments disclosed herein are not limited to any one particular antenna type, configuration, or count. For example, while a monopole based parasitic array is shown, other parasitic arrays can be utilized such as a parasitic array including microstrip patch radiating elements. In some embodiments, the antenna array 118 may be a parasitic array, for instance the C-Band parasitic array as shown. In an alternative embodiment, the antenna array may include a Ku-Band array positioned amongst the monopole. The base plate 116 (e.g., antenna substrate) may be at least partially formed from printed circuit board material and may include a 'top' surface, a 'bottom' surface, and a ground plane associated with the bottom surface. A central element 124 connects to the base plate 116. For example, the central element 124 may be a monopole element or a monopole-type radiating element, for instance an ultra-wide band (UWB) monopole structure. The central element 124 may be connected to the base plate 116 and the ground plane at the generally central location of the base plate 116 as shown. In some embodiments, the central element 124 may be an omni-directional element configured to radiate electromagnetic energy in an omni-directional radiation pattern. In some embodiments, the central element 124 may be configured for being connected to a feed line such as an RF feed line, coaxial cable, printed circuit transmission line (e.g., microstrip, stripline, etc.), and/or the like.

The antenna array 118 may further include a plurality of parasitic elements 126, for example, formed as parasitic pins as shown. In a non-limiting example, the antenna array 118 may include six (6) parasitic elements 126 arranged in a ring around and encircling the central element 124. However, it is understood that varying numbers of parasitic elements may be implemented in the antenna array as well as varying positional arrangements. For example, the antenna array 118 may include one or more additional rings of parasitic elements positioned in relation to the central element 124 and/or the first ring. Each of the plurality of parasitic elements 126 is also connected to the base plate 116 and may be connected to a load such as a load circuit or a variable impedance load. In some embodiments, each parasitic element 126 may have a corresponding load circuit connected (e.g., physically and electrically) to its base portion and/or the ground plane associated with the 'bottom' surface of the base plate 116.

In some embodiments, each load circuit may be an adjustable load circuit or a parasitic load circuit. The load circuit may include a plurality of diodes (e.g., two diodes such as two p-type, intrinsic, n-type (PIN) diodes, one or more capacitors configured for being connected to at least one of the PIN diodes, a resistor configured for being connected to at least one of the one or more capacitors, and a Direct Current (DC) bias current source configured for being connected to the resistor. In some embodiments, the DC bias current source may be configured for providing DC bias current to the resistor thereby producing a voltage across the resistor. In further embodiments, the resistor and capacitor(s) may form a low pass filter for providing the DC bias current to the diodes. In some embodiments, the load circuit may be configurable for allowing a variable (e.g., adjustable) impedance to be applied to the load circuit's corresponding parasitic element.

The central element 124 (e.g., monopole element) may be configured to receive RF energy via the feed line, and based upon the received RF energy, configured to radiate electromagnetic energy (e.g., electromagnetic waves) in multiple directions toward the plurality of parasitic elements 126 to produce a voltage across the parasitic elements 126. The applied impedance provided to each parasitic element 126 via its corresponding load circuit can be selectively varied to cause the antenna array 118 to manipulate the omni-directional monopole field radiated by the monopole element and to radiate either multiple directional beams or an omni-beam in a monopole-like radiation pattern. In some embodiments, the antenna array 118 is operable at low frequencies down to L-band and high frequencies up to Ku-band, depending on configuration and implementation.

The lighting system 112 generally includes the one or more light fixtures 120, for instance solid-state Light Emitting Diodes (LEDs) as shown. LEDs may be preferable over incandescent light bulbs in aircraft applications due to their good visibility, high reliability, comparatively small size, lightweight, low power consumption, quick transition time between intensity changes, resistance to vibration, etc. As shown, the lighting system 112 includes a plurality of individual LED fixtures 120 (e.g., six (6) LED fixtures) each mounted on the 'top' surface of the base plate 116 and collectively arranged to form a ring of LED fixtures 120 around and encircling the central element 126. As shown, the LED fixtures 120 are interspersed with the parasitic elements 126, for example, positioned in the same ring in an alternating fashion such that each LED fixture 120 is positioned between two spaced-apart parasitic elements 126 and each parasitic element 126 is positioned between two spaced-apart LED fixtures 120). LED fixture and parasitic element type, count and position may be based on desired beam and wavelength performance, among other parameters. Positional arrangements other than rings are envisioned, for instance linear arrays. In some embodiments, the lighting system 112 may include a focusing element or reflector associated with the LED fixtures 120. As show, the LED fixtures 120 have the same angle of orientation; however, it is envisioned and understood that the LED fixtures 120 may have different orientations.

The antenna system 110 and the lighting system 112 may be operably and communicatively coupled to one or more control units configured to interface with the aircraft power system. In some embodiments, the antenna system 110 and the lighting system 112 may be electrically coupled to the same control unit and interface with the same aircraft power system. The control unit may form part of the integrated assembly 100 or may located internal to the aircraft as a component of a dedicated aircraft system. In some embodiments, the control unit is configured to vary the power supplied to the LED fixtures 120 as a group or individually.

Figure 2:
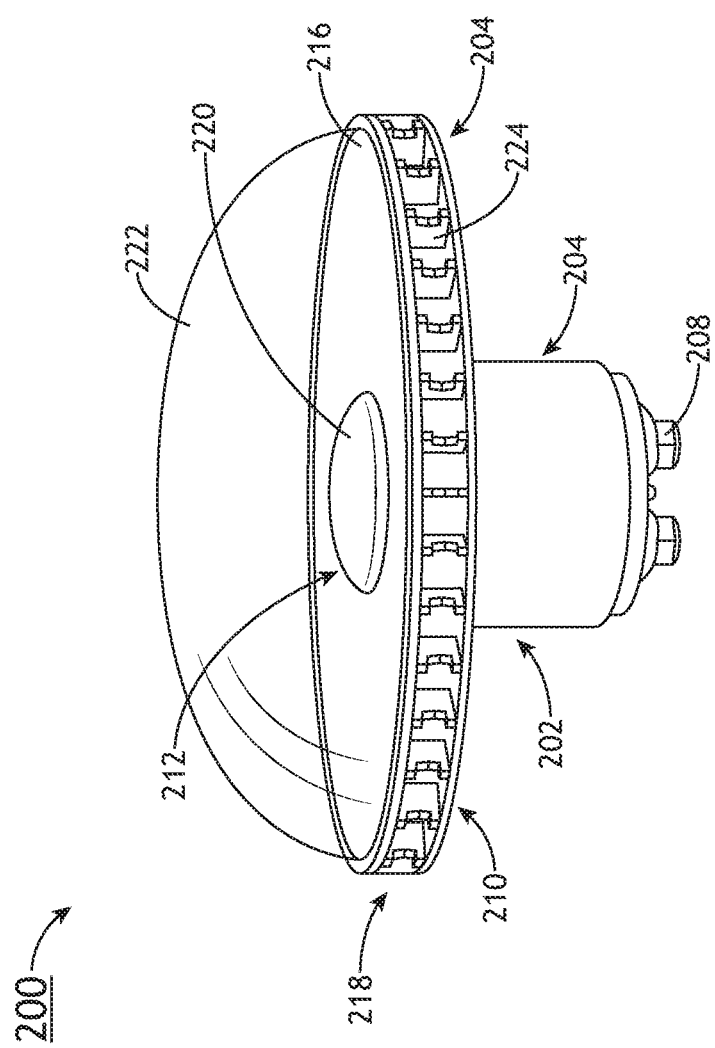
FIG. 2 illustrates an integrated aircraft assembly including an antenna array mounted proximate a lighting element in accordance with an exemplary embodiment of the present disclosure.

Referring to FIG. 2, another embodiment of an integrated assembly is shown generally at 200. Like the first embodiment discussed above, the integrated assembly 200 generally includes an aerodynamic housing 202 including a first portion 204 and a second portion 206 positioned 'atop' the first portion, and one or more electrical connectors 208 provided at the terminal end of the first portion 204 for being electrically coupled to a power source within the aircraft. The integrated assembly 200 further includes an antenna system 210 and a lighting system 212.

Whereas in the first integrated assembly 100 the antenna elements are shown positioned internal to the second portion under the cover of the lens, in the second integrated assembly 200 the antenna system 210 is shown positioned external of the lens 222, and more particularly in an annular array coupled to the bezel of base plate 216. As shown, the antenna system 210 is provided as a small form factor array of elements 218, for instance Balanced Antipodal Vivaldi Antenna (BAVA) elements. As shown, the array 218 includes a plurality of individual elements 224 arranged in an annular array surrounding the perimeter of the base plate 216 and configured, for example, for accurate Direction Finding (DF) of a received signal.

Further, whereas the first integrated assembly 100 includes a plurality of LED fixtures provided in a ring encircling the central element, the second integrated assembly 200 includes one larger form factor LED fixture 220 mounted on the 'top' surface of the base plate 216. As shown, the LED fixture 220 is mounted at the general central location of the base plate 216. In all embodiments, the configuration of the antenna system may be determinative of the light fixture count and position(s), and vice versa. For example, whereas the parasitic array depicted in the first integrated assembly 100 allows for a lighting assembly provided as a ring array, the position of the central element 124 in the first integrated assembly 100 conflicts with the LED fixture 220 position in the second integrated assembly 200. Therefore, some antenna systems may be compatible with some lighting systems while others may not, due at least in part to the positional requirements of the system elements.

Figure 3:
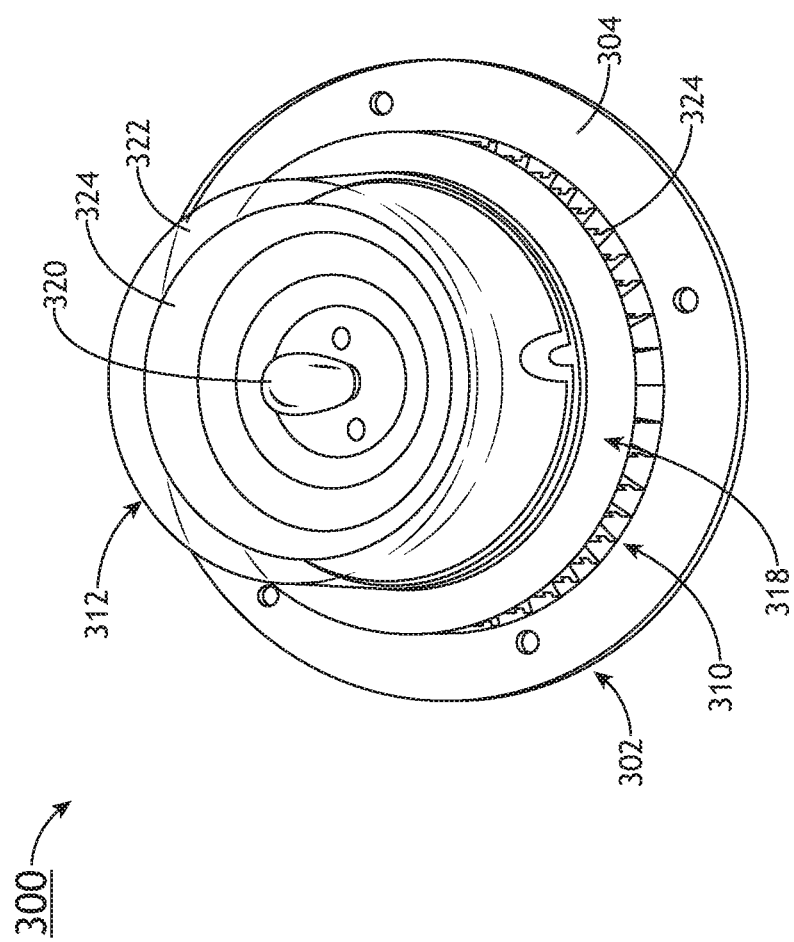
FIG. 3 illustrates an integrated aircraft assembly including an annular antenna array surrounding a lighting element in accordance with an exemplary embodiment of the present disclosure.

Referring to FIG. 3, another embodiment of an integrated assembly is shown generally at 300. The integrated assembly 300 includes an aerodynamic housing 302 having an annular flange 304 with apertures for mounting the assembly to an exterior of an aircraft. The lighting system 312 may be disposed within a central opening of the housing 302. As shown, the lighting system 312 may be a self-contained assembly including a light fixture 320 centrally disposed within a transparent lens 322 further containing a reflector 324 and circuitry associated with the light fixture 320.

As shown, the antenna system 310 is provided as an annular array 318 positioned external to the transparent lens 322 and incorporated into or otherwise mounted to the annular flange 304. In some embodiments, the annular array 318 may be a BAVA array including a plurality of individual BAVA elements 324 arranged in an annular array surrounding the perimeter of the transparent lens 322 and configured, for example, for accurate DF of a received signal, among or in addition to other functions.

Figure 4A:
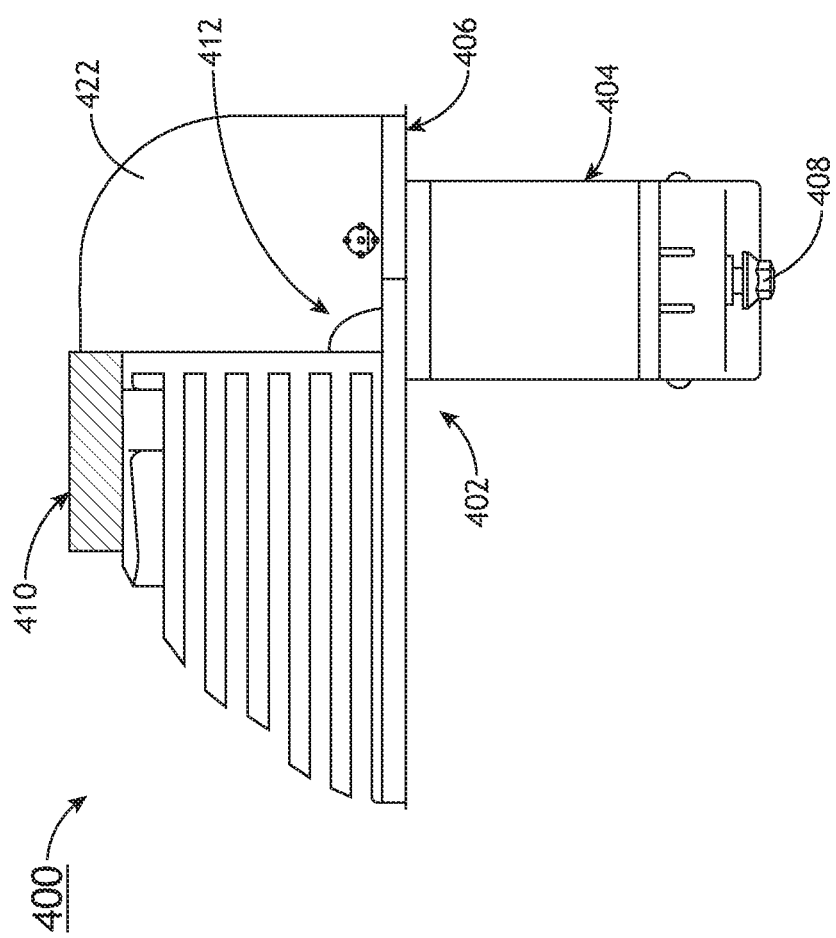
FIG. 4A is a aide elevation view of an integrated aircraft assembly formed as an aircraft exterior light in accordance with an exemplary embodiment of the present disclosure.

Referring to FIGS. 4A and 4B, another embodiment of an integrated assembly is shown generally at 400. As shown, the aerodynamic housing 402 of the integrated assembly 400 is formed as a position light configured to be mounted external to an aircraft. The aerodynamic housing 402 generally includes a first portion 404 for being received in an aperture in an airframe and a second portion 406 for being mounted external to the aircraft. One or more connectors 408 may be provided at a terminal end of the first portion 404 for connecting with a power source internal to the aircraft. In some embodiments, an externally threaded connector may be provided at the terminal end of the first portion 404 for being received in an internally threaded portion in the airframe.

As shown, the second portion 406 is positioned 'atop' the first portion 404 and contains one or more light fixtures 420 of the lighting system 412 positioned under the cover of the transparent lens 422 coupled to the base plate 416. As further shown, the antenna system 410, for instance a Ku-band parasitic array, is positioned atop the second portion 406 and provides, for example, one or more of communication, navigational, sensing, and flight-critical functions, while the lighting system 412 may provide illumination for the exterior of the aircraft. In some embodiments, the integrated assembly 400 may further include a reflector and heat sink provided in the second portion 406.

While particular examples of antenna and lighting systems have been discussed herein with reference to the various embodiments, it is understood that other systems may be utilized, for example, antenna assemblies that support a broad range of frequency bands. In some embodiments, larger antenna assemblies may be co-located in larger light fixtures (e.g., landing and taxi lights) to provide frequency coverage down to the L-band. Other examples of antenna assemblies for integration into lighting structures include, but are not limited to, circular BAVA arrays and other Vivaldi/TEM horn array variants, reflector-backed monopole circular arrays, sectoral horn arrays, squatty biconical antennas, radial T-line antennas (e.g., CDISK), microwave frequency pill box antennas, other ground plane driven antennas, etc.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An integrated aircraft assembly, comprising:
   an aerodynamic housing attachable to an aircraft, the aerodynamic housing including a first portion for being received through a structurally reinforced aperture formed in an airframe of the aircraft and a second portion for being positioned external to the aircraft;
   an antenna system housed within the aerodynamic housing, the antenna system comprising a substrate and an antenna array, the antenna array comprising a central element provided on the substrate in a central position on the substrate and a plurality of parasitic elements provided on the substrate in a predetermined positional relationship relative to the central element; and
   a lighting system housed within the aerodynamic housing, the lighting system comprising a plurality of light fixtures interspersed with the plurality of parasitic elements;
   wherein the antenna system and the lighting system function independently.

2. The integrated aircraft assembly according to claim 1, further comprising a base plate which functions as the substrate of the antenna assembly and a mounting surface for the plurality of light fixtures.

3. The integrated aircraft assembly according to claim 2, wherein the second portion comprises a bezel surrounding and supporting the base plate and a transparent lens coupled to the bezel, wherein the antenna array and the plurality of light fixtures are disposed beneath the transparent lens.

4. The integrated aircraft assembly according to claim 1, further comprising at least one connector provided at a terminal end of the first portion for connecting with a power source internal to the aircraft.

5. The integrated aircraft assembly according to claim 1, wherein the antenna array is positioned internal to the second portion of the aerodynamic housing.

6. The integrated aircraft assembly according to claim 1, wherein the antenna array is positioned external to the second portion of the aerodynamic housing.

7. The integrated aircraft assembly according to claim 1, wherein the antenna system is operable for providing at least one of a communication, navigation, sensing, and flight-critical function, and wherein the lighting system is operable for providing illumination for the exterior of the aircraft.

8. The integrated aircraft assembly according to claim 1, wherein the aerodynamic housing is formed as an exterior aircraft light.

9. The integrated assembly according to claim 1, wherein the antenna array is mounted atop the second portion of the aerodynamic housing.

10. The integrated assembly according to claim 1, further comprising at least one control unit communicatively coupled to at least one of the antenna system and the lighting system and configured to interface with an aircraft power system.

11. An integrated aircraft assembly, comprising:
a housing formed as an exterior aircraft lighting assembly, the housing including a first portion for being attached to an aircraft and a second portion for being positioned external to the aircraft;
an antenna array coupled to the housing; and
at least one light fixture coupled to the housing;
wherein a function of the antenna array is independent of a function of the at least one light fixture; and
wherein the housing is formed as an aerodynamic housing comprising a base plate, the antenna array comprises a plurality of individual elements arranged in an annular array around the base plate, and the at least one light fixture is a light emitting diode (LED) mounted on the base plate.

12. The integrated assembly according to claim 11, wherein the antenna array and the at least one light fixture are co-located in the housing.

13. The integrated assembly according to claim 11, wherein the second portion of the housing comprises the base plate and a lens coupled to the base plate, the at least one light fixture is positioned in the second portion under cover of the lens, and the antenna array is mounted to the base plate.

* * * * *